(12) United States Patent
Gabriel

(10) Patent No.: US 6,325,328 B1
(45) Date of Patent: *Dec. 4, 2001

(54) SUSTAINED BUOYANCY SYSTEM FOR AVOIDING AIRCRAFT CRASHES

(76) Inventor: Edwin Zenith Gabriel, 91 Mt. Tabor Way, Ocean Grove, NJ (US) 07756

( * ) Notice: Subject to any disclaimer, the term of this patent is extended or adjusted under 35 U.S.C. 154(b) by 0 days.

This patent is subject to a terminal disclaimer.

(21) Appl. No.: 09/514,125

(22) Filed: Feb. 28, 2000

Related U.S. Application Data

(63) Continuation-in-part of application No. 09/470,737, filed on Dec. 23, 1999.

(51) Int. Cl.$^7$ .................................................. B64C 29/00
(52) U.S. Cl. ............................................................ 244/23 A
(58) Field of Search ............................. 244/5, 12.1, 12.3, 244/23 A, 139

(56) References Cited

U.S. PATENT DOCUMENTS

| | | | |
|---|---|---|---|
| 1,705,535 | * | 3/1929 | Riffert . |
| 3,056,565 | * | 10/1962 | Griffith . |
| 3,061,241 | * | 10/1962 | Holland, Jr. . |
| 3,309,041 | * | 3/1967 | Etchberger . |
| 5,806,553 | * | 9/1998 | Sidwell ............................. 137/487.5 |
| 6,199,664 | * | 3/2001 | Kumar .................................. 184/3.2 |

* cited by examiner

Primary Examiner—Michael J. Carone
Assistant Examiner—Kevin Jakel

(57) ABSTRACT

This is a relatively simple system for avoiding light aircraft crashes, using rate-of-turn sensors, high pressure air tanks, solenoid-operated air valves and an air compressor. The rate-of-turn sensors are described in Gabriel's previous patent application, filed Dec. 23, 1999, as well as the interconnected circuitry required to operate the air valves, when needed, to make corrections to an aircraft, possibly out of control. This system includes an air compressor to replenish air used in air tanks, when air valves blast off to make a correction in the aircraft's altitude, so this system can continue to provide the needed buoyancy and altitude corrections until the aircraft is able to land safely. The compressor is provided with controls so that whenever a tank loses some of its air pressure, the compressor operates to force air into the air-depleted tank.

5 Claims, 5 Drawing Sheets

BOUYANCY SYSTEM FOR ENTIRE AIRCRAFT
10 SOLENOID AIR VALVES.
SCHEMATIC

SUSTAINED BUOYANCY SYSTEM FOR AVOIDING AIRCRAFT CRASHES

This system is a continuation in-part of a pending patent application, Ser. No. 09/470,737, filed Dec. 23, 1999. The pending application did not include a compressor to replenish air in a high pressure tank when air in the tank depletes and air pressure in the tank falls.

None of the work of this invention was performed under any Federally-Sponsored or State-Sponsored research and development. Gabriel used his own resources on every phase of this project.

BACKGROUND OF THE INVENTION

1. Field of the Invention

This invention is in the field of aircraft safety in flight, wherein even if the pilot were to make an error, the system will attempt to make the desired corrections to avoid and prevent the aircraft from going out of control and crashing. This disclosure with illustrations describes how the system functions to prevent an aircraft crash, by continually making any corrections to the aircraft's malfunctioning control system to keep the aircraft aloft, until it can be safely landed.

2. Description of Prior Art

The inventor is aware only of his own U.S. patent applications. The serial numbers of his applications are Ser. No. 09/366,262, filed Aug. 2, 1999 and Ser. No. 09/470,737, filed Dec. 12, 1999.

SUMMARY OF THE APPLICATION

This is a novel technique for helping prevent a lightweight aircraft from crashing should the aircraft experience engine or mechanical control problems. Air valves, through which air blasts out, are judiciously placed on the belly and wings of the aircraft, zoned to operate and make the desired corrections whenever either the aircraft's pitch angle or roll angle becomes excessive. The previous patent application, filed Dec. 23, 1999, did not include an air compressor to replenish the air in the air tank, when the high pressure air is blasting out through the valve's outlet. In this application, a single compressor automatically supplies compressed air to two or more tanks whenever a tank's air pressure is reduced, in order to enable blasts of air to be discharged through an air valve's outlet as long as necessary to correct the aircraft's exclusive roll or pitch angle.

This application reinforces and enhances the safety features of the buoyancy system for aircraft described in patent application filed Dec. 23, 1999.

BRIEF DESCRIPTION OF THE DRAWINGS

For the purpose of illustrating the control system for preventing light aircraft crashes, the following drawings show forms which are preferred. It is to be understood that this invention is not necessarily limited to the precise arrangement, instrumentalities and field of utility as therein demonstrated.

The aircraft's altimeter's output voltage closes the circuit relay when the aircraft descends at a rate in excess of a pre-determined value.

A PREFERRED EMBODIMENT

Sustained Air Blast System to Provide Buoyancy for a Light Aircraft

In previous patent applications, solenoid-operated air valves received high pressure air from a high air pressure tank. The air valve and the tank would be installed in the vehicle. The blasts of air from the valve would occur either to prevent or lessen the impact of a collision with another vehicle or to provide buoyancy to an air-borne vehicle. The tank would be filled with air under high pressure prior to the vehicle use. The air compressor would not necessarily be in the vehicle, but would be located external to the vehicle. The disadvantage to this arrangement is that once the tank's air is discharged, the system is no longer operational. Hence, in this disclosure an on-board air compressor is added to the system to replenish the air used by the valve, in order to sustain the required air blasts as long as needed to perform the desired task.

Figure 1:
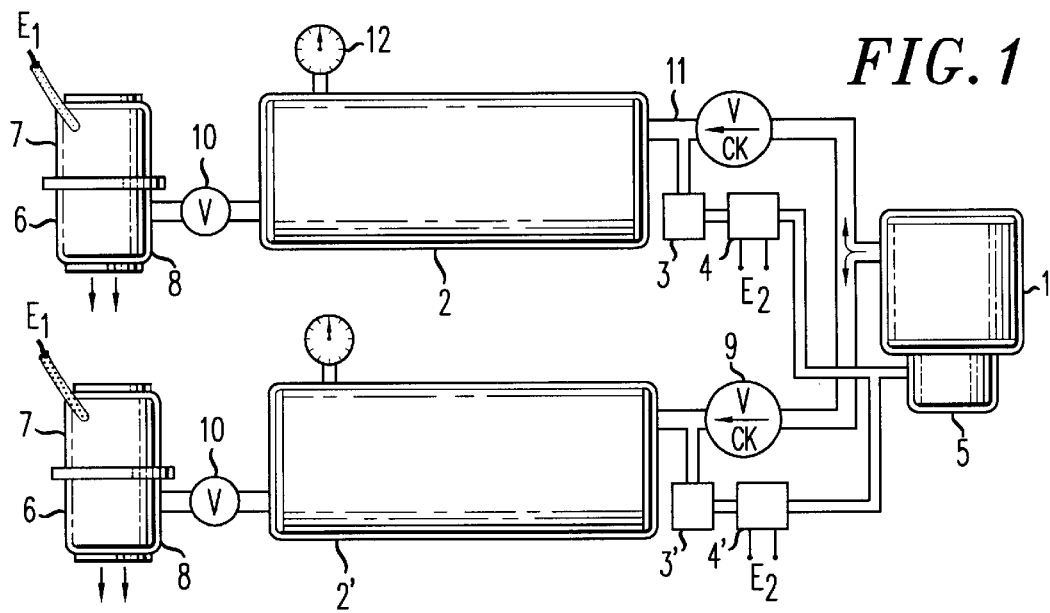
FIG. 1 shows a diagram of a single compressor with its outlet connected to two tanks and each tank connected to an air valve.

A single compressor 1 supplies air to one or more tanks. In FIG. 1, compressor 1 is connected to supply air to two tanks 2, 2', when either one's air pressure is reduced below a predetermined value. Air pressure in tank 2 is sensed by air-pressure-to-voltage transducer 3. The voltage output of transducer 3 is applied to relay 4 which closes the circuit for applying voltage, $E_2$ to compressor motor 5, when more air pressure is needed for tank 2.

The air compressor motor 5 is heavy. Therefore, when applied for providing buoyancy for an aircraft, it is suggested that the number of compressors be held to a minimum. A single air compressor 1 is suggested for light aircraft to supply air to air tanks, such as 2, supplying compressed air to valve 6. For an aircraft, a rate-of-turn sensor, sensing either pitch angle or roll angle of the craft in flight applies voltage, via a power relay, when the angle exceeds a predetermined value, Solenoid 7 opens the valve to allow high pressure air from tank 2 to flow into valve 6 and blast out at opening 8, to provide the needed correction to the aircraft's altitude or roll.

The rate-of-turn sensors and the components and circuits needed to activate Solenoid 7, when the air blast is needed; are provided in a patent application, Ser. No. 09/470 737, by Edwin Z. Gabriel.

Although FIG. 1 shows compressor 1, supplying just two air tanks 2 and 2', a single compressor could be connected to supply air for four or more tanks. Thus, when the aircraft's pitch exceeds a predetermined valve, two of the front fuselage air valves are activated to correct the pitch angle to an accepted value.

When compressor 1 is connected to four tanks, then the other two tanks could supply air to valves located on the wings of the aircraft, one valve on each wing to help correct the roll angle to a corrected, acceptable valve, when the angle of roll exceeds a predetermined value. Thus, a single air compressor could replenish the needed air in air tanks for making the necessary roll angle and pitch angle corrections, allowing the plane's pilot to maintain or regain control; say, from preventing the aircraft from going into a tail spin and crashing. Prime mover 5, which could be an electric motor, a gasoline reciprocating engine or a hydrogen-based power source, would power and operate the compressor.

ANOTHER PREFERRED EMBODIMENT

Figure 2:
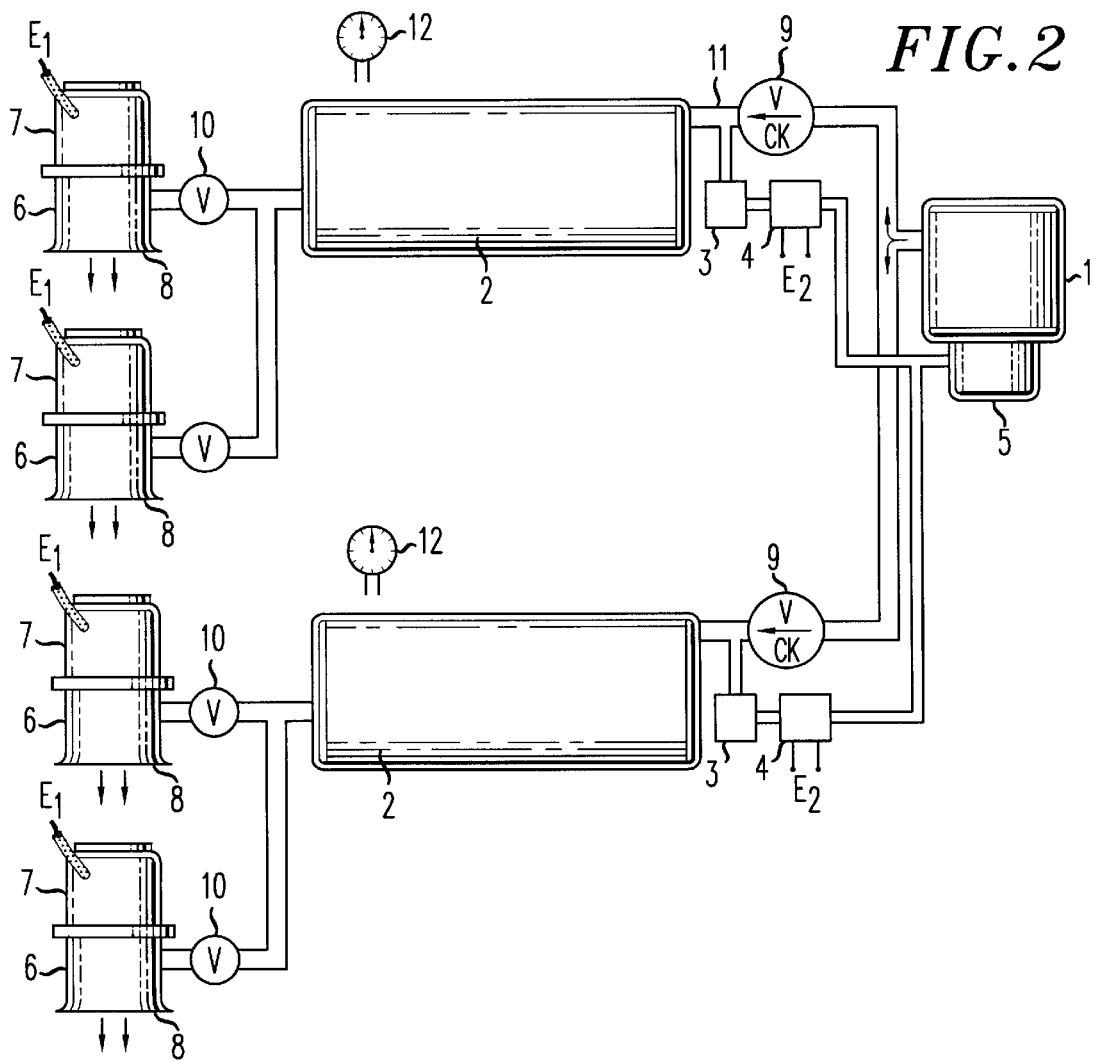
FIG. 2 shows a diagram of a single compressor with its outlet connected to a single tank and the single tank's outlet connected to two air valves. Air from either valve is discharged only when the closed valve is opened by an activated solenoid.
Figure 3:
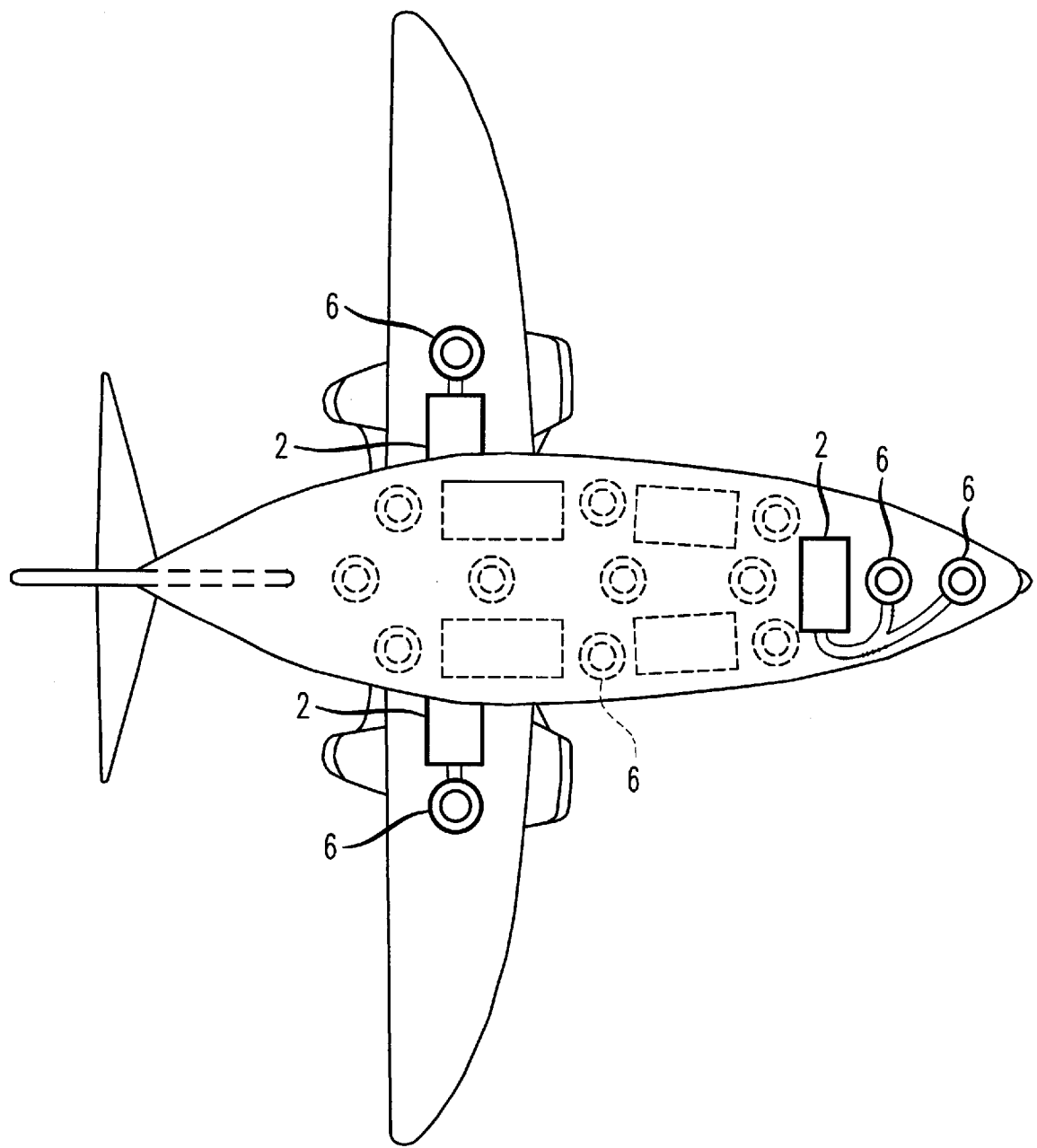
FIG. 3 shows the belly of a fixed wing aircraft, with 4 air-valves, outlet ports, —two for pitch angle correction and two on the wings for roll angle correction. Additional valves may be added, with or without additional tanks, but these tanks may or may not have automatic replenishing of air from an air compressor. Additional air compressors with motors are heavy and would burden the aircraft with too much weight. For Buoyancy ton additional valves are shown in dashed lines.

In this embodiment, FIG. 2, only a single air tank 2 supplies air to either or both of two air valves 6 and 6'. These air valves and tank 2 would be installed in the vehicle, in this case a fixed-wing aircraft, FIG. 3. As in FIG. 1, again a single compressor 1 supplies air under pressure to tank 2, via check valve 9. Air-pressure-to-voltage transducer 3, connected to air inlet pipe 11, senses the air pressure within the tank and converts pressure to voltage. When the voltage is below a predetermined value, relay 4, connected to the output of transducer 3, closes the $E_2$ circuit so compressor motor 5 is energized, and outside air is compressed and forced into tank 2, via check valve 9. Thus, air in tank 2 is replenished to the desired pressure. Hence, when either or both air valves 6 and 6' are opened by solenoids 7 and 7', high pressure air blasts at outlet 8, passing through valves as indicated, to provide the desired buoyancy to provide lift to the rapidly descending aircraft. In FIG. 3, dashed circles represent air valves without an air compressor to replenish high pressure air to the tanks to which they are connected. These air valves are shown in patent application, Ser. No. 09/470,737, dated Dec. 23, 1999, as undashed, full circles.

For both embodiments, FIG. 1 and FIG. 2, air pressure in tanks 2 and 2' will decrease rapidly as air blasts out valves 6 at exit 8. Thus, in a few seconds, depending upon the size of tank 2, pressure inside the tank could be reduced by one-half. Hence, if a pressure of say 75 psi is needed for the valves, initial pressures inside the tank could be increased to, say, 100 psi, then a higher pressure within the tank could be retained and for a few seconds longer. Pressure within the tank is provided by compressor 1, operated by prime mover 5. For compressor 1 to keep up with the flow of air out of tanks 2 and 2', the compressor would need to be large, so would the power needed by the prime mover. Hence, to keep size and weight within acceptable magnitudes, both compressor and prime mover should be kept much smaller than required to meet immediate air pressure demands. Thus, tank 2 and 2' would initially be filled to the desired air pressure, and the time required for replenishment could be tailored to any particular aircraft application. Valves 6 could be kept closed, say by a switch, until both tanks 2 and 2' regain their required pressures. Ideally, the initial blast of air from valves 6, would make the necessary correction to either the pitch angle or the roll angle of the aircraft, until tanks 2 and 2' are replenished with high pressure air.

Figure 4:
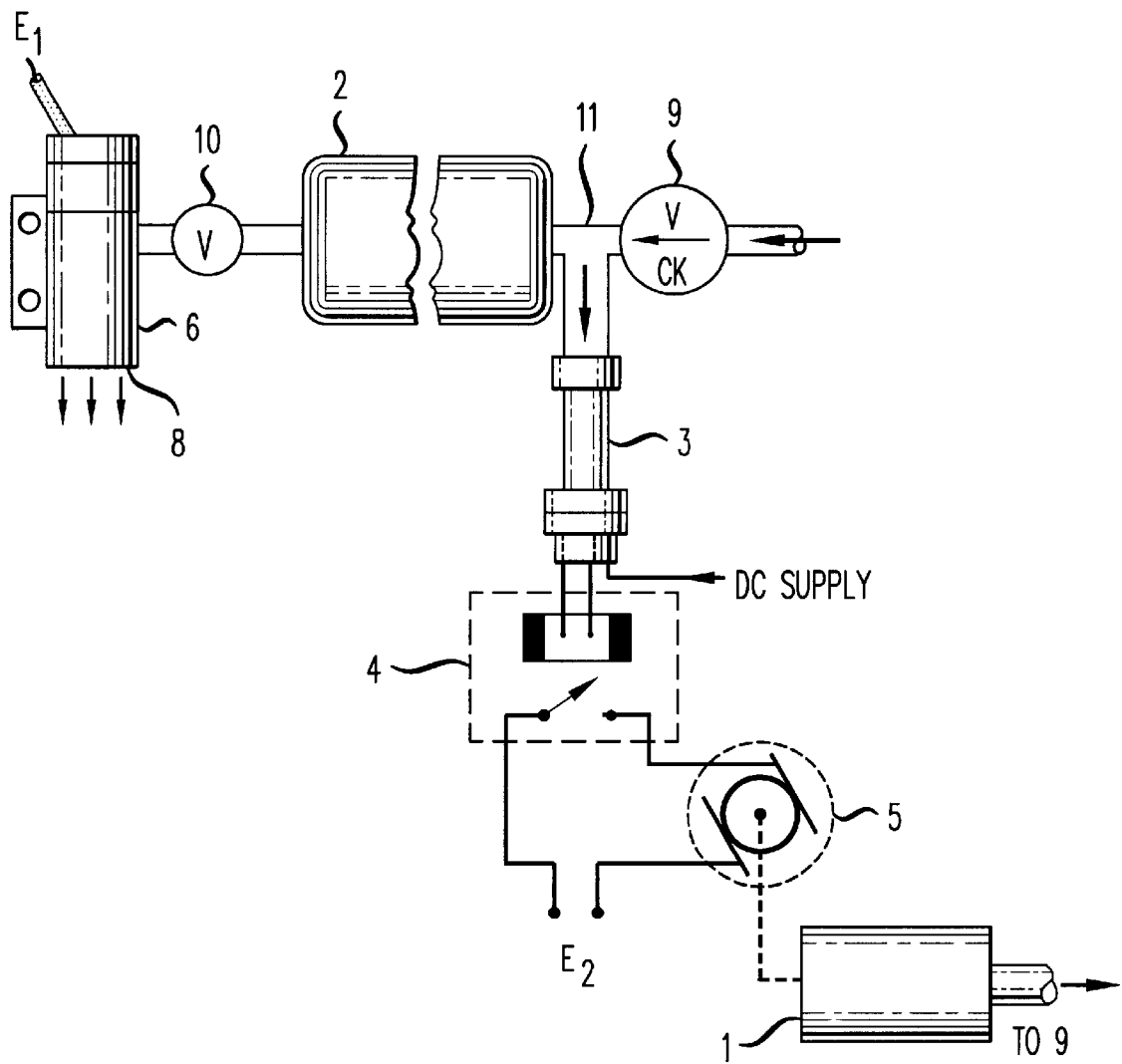
FIG. 4 is a circuit diagram of the connections between the compressor, transducer and relay to show how electrically the compressor is energized.
Figure 5:
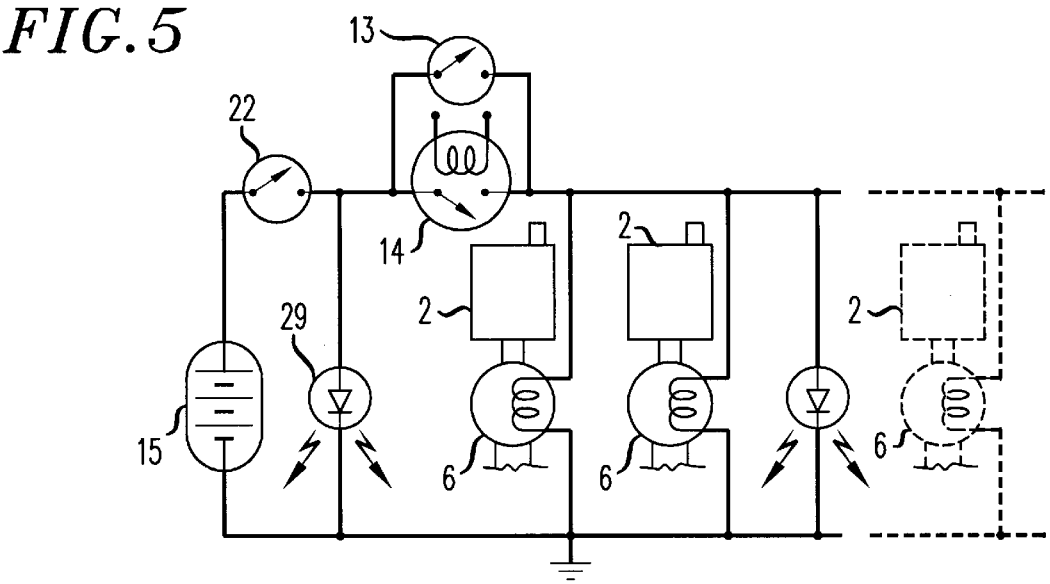
FIG. 5 is a schematic wiring diagram for two pitch axis aircraft angles. A relay automatically closes the circuit when its rate-of-turn sensor senses an excessive angle in pitch axis.

For a more detailed drawing of FIGS. 1 and 2 Control System, FIG. 4 is presented to provide specific information on parts and components which are available off-the-shelf, thus enabling one to quickly assemble the compressor —tank—air-valve control system. In FIG. 4, GAST provides compressor 1 coupled to motor 5. GAST also provides 30 Gallon tank 2 as part of the Compressor System. The compressor is designed to operate whenever tank pressure decreases to a predetermined value. Air from compressor 1, via piping 11', enters through check valve 9 to both enter tank 2 and ASH-CROFT transducer 3. High pressure air passes through gate valve 10 into ARO AIR VALVE 6 when a demand for air blasts is called for at outlet 8, by the rate-of-turn or angle-of-turn sensor of the aircraft. When signal from the turn sensor closes the relay, such as relay 14 of the pitch axis circuit, FIG. 5, then valves 6 are opened by solenoids 7, FIGS. 1 and 2, allowing high pressure air from tank 2 to pass through valves 6 and blast out at outlets 8. Whenever air pressure in tank 2 decreases from a desired preset value, ASH-CROFT transducer 3's output voltage decreases to a lower value, causing relay 4 to close the circuit of motor 5, thus operating compressor 1. FIG. 5 shows the circuit for controlling and providing buoyancy for the aircraft's pitch axis. In FIG. 5, the system can be operated either manually by using switch 13, or automatically by using the output of rate-of-turn sensor on the aircraft and relay 14 to close the circuit of the electrical loop. Voltage source 15 provides voltage to the circuit.

Figure 6:
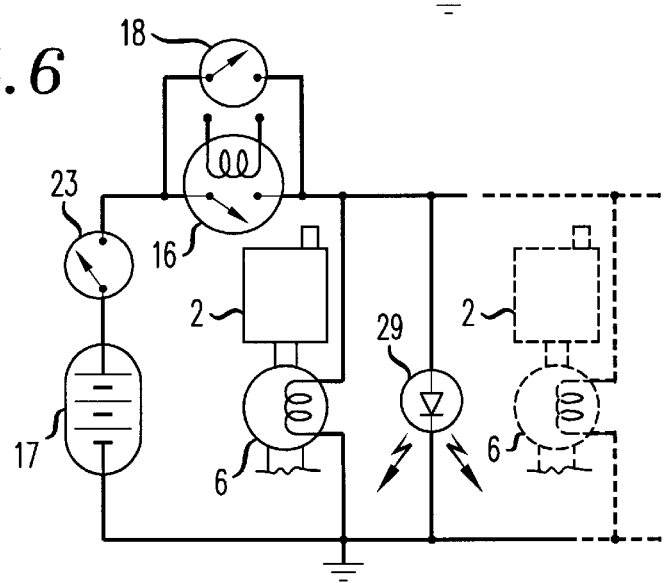
FIG. 6 is a schematic wiring diagram of one solenoid air valve for automatically controlling and correcting for any excessive fuselage left side roll angle.

FIG. 6 shows the circuit for controlling and providing buoyancy for one of the aircraft's roll axis, say the aircraft's left roll side. A single air valve is shown in FIG. 3 of the aircraft's underneath wing, but additional air valves could be added, as needed to provide buoyancy and prevent the aircraft from rolling over on its left side. The solenoid 7 of air valve 6 receives its signal from a roll angle sensor that says that the fuselage roll angle is excessive and needs to be reduced. Relay 16 is in series with solenoid valve 6 and is closed by the output, integrated voltage of the roll rate sensor, when a predetermined selected value of voltage is reached. Voltage source 17 provides the required energy to solenoid 7 of valve 6, to open the valve for air to blast through, when required. Manual switch 23 is added in series with relay 16.

Figure 7:
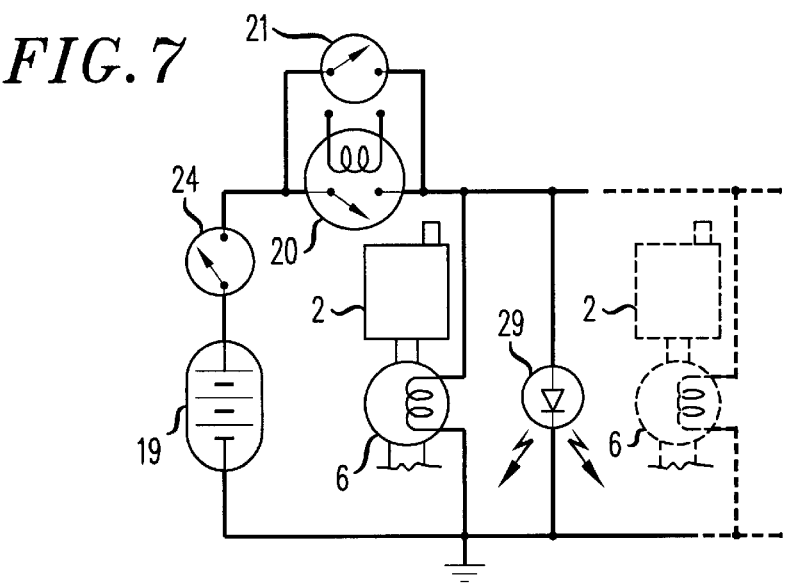
FIG. 7 is a schematic wiring diagram of one solenoid air valve for automatically correcting ally excessive fuselage right side roll angle of the aircraft.

FIG. 7 shows the circuit for controlling and providing buoyancy for the aircraft's right side, roll axis, and preventing excessive roll-axis angle of the fuselage. Here again the circuit, representing the system, can be activated either manually, using switch 21, or automatically using the output, integrated voltage of the appropriate roll-rate sensor, when a selected value of the voltage is reached. Voltage source 19 provides the required voltage and current to the solenoid valve 6. Relay 20 is closed by the integrated voltage of the appropriate roll-rate sensor. In the schematic although a single solenoid valve is shown, additional valves with solenoids may be used, if needed, to prevent excessive aircraft roll over. High pressure air is provided by tank 2. According to the schematic of FIG. 4, a tank 2 that is depleted of air is replenished with high pressure air automatically from air compressor 1. Check valve 9 prevents air in tank from leaving the tank via pipe 11, FIG. 4. A manual switch 24 is added in series with relay 20, in case the pilot wishes to disconnect this roll axis buoyancy system.

Each circuit, shown in FIGS. 5 to 8, has a light emitting diode (LED) to inform the pilot of the activation of any of the circuits for roll, pitch , buoyancy, and to provide warning that the aircraft has experienced a possible mechanical or electrical problem, and that he should consider landing his aircraft as soon as possible. The LED is identified by numeral 29.

Description of Air Buoyancy System for Entire Aircraft

Figure 8:
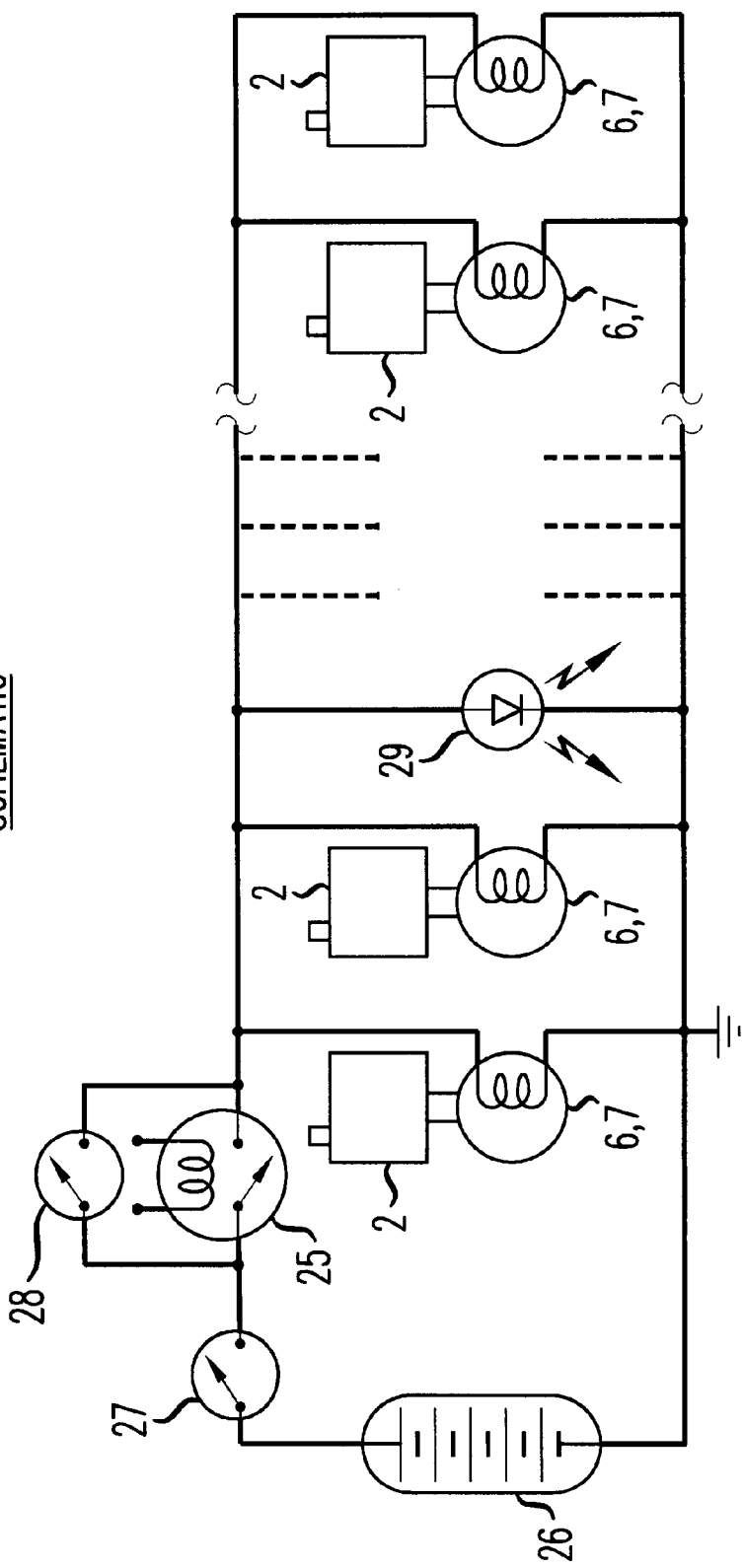
FIG. 8 shows the schematic diagram for providing buoyancy for the entire belly of the fuselage. Ten solenoid air valves are shown here and also in FIG. 3 in dashed lines.

If an entire aircraft would be buoyancy sustained, then the ten valves shown in dashed lines, FIG. 3, would be utilized. These valves are symmetrically located about the fuselage's control axis. To reduce the number of air tanks needed to supply air to the valves, two air valves may be connected to a single tank, so that for 10 valves, 5 tanks would be required, to provide high pressure air when needed. The tanks would be fabricated of light-weight metal to-keep the weight of the buoyancy as light as possible. The schematic is shown in FIG. 8.

With each solenoid valve weighing 1.3 lbs., the 10 valves would weight 13 lbs. Assuming lightweight piping for interconnecting valves with tanks, estimate the piping to weigh 7 lbs. Then, assuming lightweight, 30 gallon tanks, each weighing 8 lbs., the 5 tanks would weight 40 lbs. Thus, the weight of the entire system could weigh a little over 66 lbs. The system would be activated either by the closing of relay 25 or the closing of manual switch 28, assuming switch 27 is closed, FIG. 8, just before the aircraft landed, to avoid too rapid a descent and a crash. The sensor supplying the signal for automatically closing relay 25 would be the aircraft's altimeter, for the buoyancy system to operate automatically.

I claim:

1. A light aircraft with a fuselage, wings and a belly and with provision to provide the desired buoyancy via pitch angle control, of the aircraft, when needed to avoid said aircraft from crashing, so that said aircraft would descend slowly without diving and land on terrain softly, instead of crashing at a high descent speed, said provision being an electrical control circuit, including an input voltage source, a remotely-operated relay, a first manual switch, compressed air tanks, solenoid-operated air valves with input and outlet ports and at least one air compressor with a prime mover to replenish spent air in said tanks, with said air valves for pitch control being electrically connected in parallel with said voltage source, said air valves and said tanks being mounted on the front portion of said fuselage's belly, with each of said air valves' input ports being connected to a tank with piping, said remotely-operated relay having its circuit closed by the output of a rate of turn sensor, said first manual switch for short-circuiting said relay, said air compressor to replenish depleted compressed air in said air tanks, after said air valves blast out air vertically downward to lift the nose of said aircraft, when required; said compressed air being allowed to replenish air for said tanks via an air-pressure-to-voltage transducer and a second relay, said transducer sensing the tank's air pressure, sending an electrical signal to said second relay, when said tank's air pressure decreases to a predetermined value, closing the input voltage to said control circuit energizes said prime mover of said compressor, thus high pressure air being available for said air valves, whenever needed.

2. A light aircraft with provision for avoiding a crash in accordance with claim 1, wherein a control system being provided with said rate-of-turn sensor for sensing roll angle for each left and right side of said fuselage, and with means for preventing said aircraft from exceeding a predetermined, selected roll angle, said means being said solenoid-operated air valves located on the left and right under sides of said wings, each air valve opening when the signal from an assigned roll-angle sensor exceeds a predetermined value, to blast out air to reduce the amount of roll angle of said fuselage, thus helping the pilot to gain control of his aircraft; said air compressor to replenish depleted compressed air in said air tanks, after said air valves blast out air vertically downward to lift and level out the desired wing of the aircraft; said compressed air being allowed to replenish air for said tanks, via an air-pressure-to-voltage transducer and a third relay, said transducer sensing the tank's air pressure, sending an electric signal to said relay, when said tank's air pressure decreases to a predetermined, set value, and closing the input voltage circuit to the prime mover of said compressor, thus enabling high pressure air to be available for said air valves.

3. A light aircraft with a fuselage and a belly, and with a system for providing the desired buoyancy for the entire aircraft, so that said aircraft encountering a malfunction control problem could descend slowly and land on terrain softly, said system being an electrical control circuit, a voltage source, a remotely-operated relay, compressed air tanks and solenoid-operated air valves, with input ports and output ports, distributed uniformly along said fuselage's belly; said solenoid-operated valves electrically connected in parallel with said voltage source, said output air of said air valves' output ports temporarily sustaining said aircraft aloft, said air valve with input ports being connected to said air tanks with piping, said remotely-operated relay having its circuit closed by the output voltage of an altimeter sensor, said relay having a bypass first manual switch to enable the aircraft's pilot to close said circuit at any time in order to save the aircraft from descending too rapidly and crashing; said pilot being able to turn "ON" the buoyancy system just prior to the aircraft's landing on terrain.

4. A light aircraft with provision for avoiding a crash upon landing in accordance with claim 3, and wherein said electrical control circuit having a second manual switch in series with said relay and with said first manual switch; said second switch to prevent said air valves from being turned "ON" prematurely, said second manual switch being open, and being closed by said pilot just prior to the aircraft's landing on terrain, in order to be assured that said air tanks having a sufficient amount of the desired high pressure air to blast out by said valves to prevent said aircraft from crashing.

5. A light aircraft with provision for crash avoidance in accordance with claim 1, in which said electrical control circuit includes a light emitting diode to indicate and inform the air-craft pilot that said circuit has been activated.

* * * * *